United States Patent [19]

Takagi et al.

[11] 4,377,048
[45] Mar. 22, 1983

[54] DISPLAY RETAINING MEANS ASSEMBLY

[75] Inventors: Susumu Takagi, Iwaki; Nobuhiko Suzuki, Tokyo, both of Japan

[73] Assignee: Alps Electric Co., Ltd., Tokyo, Japan

[21] Appl. No.: 325,294

[22] Filed: Nov. 27, 1981

[30] Foreign Application Priority Data

Nov. 26, 1980 [JP] Japan .......................... 55-169332[U]

[51] Int. Cl.³ ............................................. G02B 27/02
[52] U.S. Cl. ..................................... 40/367; 40/10 R; 40/156
[58] Field of Search ................... 40/361, 367, 10, 156; 340/24, 705

[56] References Cited

U.S. PATENT DOCUMENTS

| | | | |
|---|---|---|---|
| 2,239,032 | 4/1941 | Boch | 40/367 |
| 2,771,593 | 11/1956 | Straehl | 340/24 |
| 3,160,851 | 12/1964 | Ramsayer | 340/24 |
| 3,249,691 | 5/1966 | Bigelow | 40/361 |
| 3,359,563 | 12/1969 | Stetten | 340/705 |
| 3,748,765 | 7/1973 | Bass et al. | 40/367 |
| 3,953,764 | 4/1976 | Miller et al. | 40/361 |
| 4,261,125 | 4/1981 | Rappaport | 40/367 |

Primary Examiner—Gene Mancene
Assistant Examiner—Wenceslao J. Contreras
Attorney, Agent, or Firm—Guy W. Shoup; Gerard F. Dunne

[57] ABSTRACT

A sheet fixing device for fixing a sheet such as a transparent map film sheet on the display surface of the display surface of a cathode ray tube of an information display apparatus such as an automobile position display apparatus. The device has a sheet pressing member having provided with sheet pressing rubber portions and adapted to be biased toward the display surface by a plurality of independent biasing member spaced from one another. The sheet pressing member is adapted to be driven by sheet pressing member lifting levers which in turn are actuated by cams adapted to be rotated together with a sheet guide. When the sheet guide is rotated to the position for taking out the sheet, the cams actuate the sheet pressing member lifting levers to cause the latter to drive the sheet pressing member away from the display surface of the cathode ray tube.

5 Claims, 10 Drawing Figures

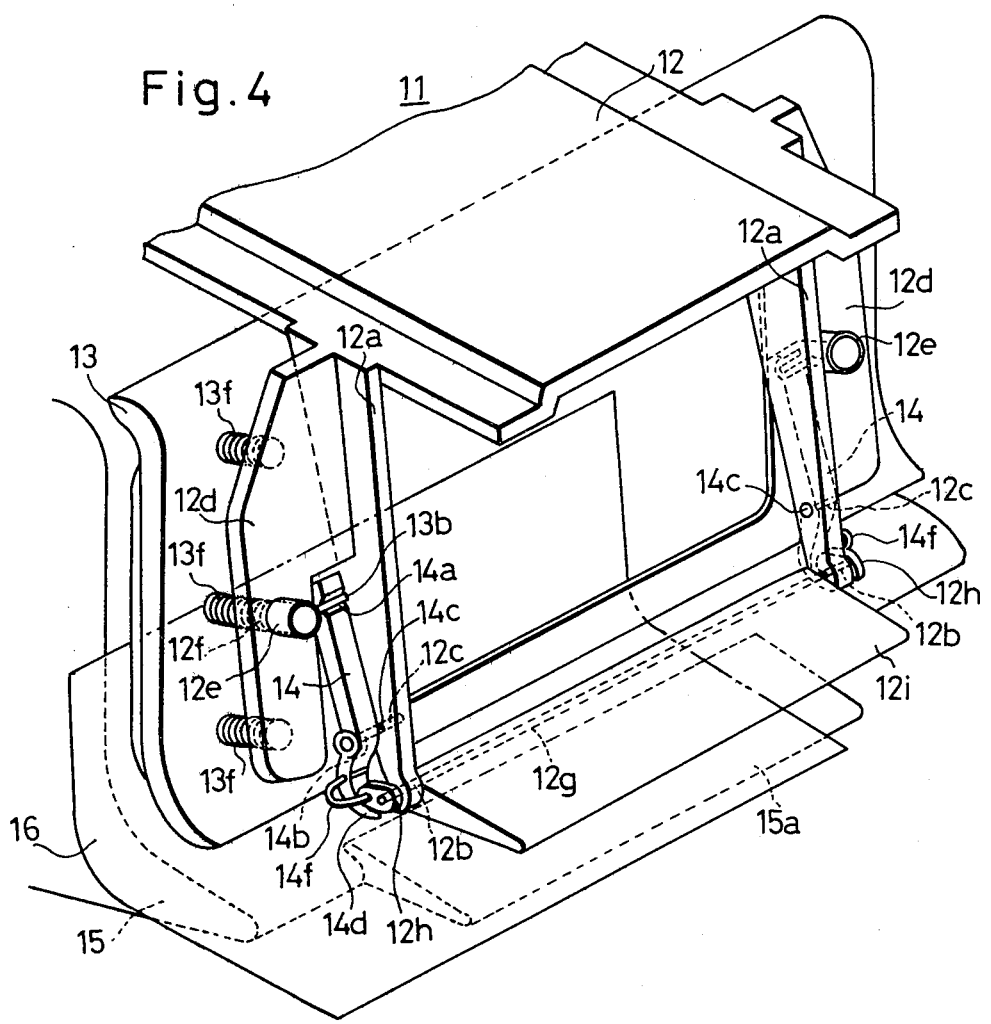

DISPLAY RETAINING MEANS ASSEMBLY

BACKGROUND OF THE INVENTION

The present invention relates to a device for fixing a sheet (map film) for use in an information display unit adapted to display the present position of an automobile on the map film by means of a spot of light which moves along the course of movement of an automobile.

An automobile position display unit developed recently has a cathode ray tube on the surface of which a map film is placed so that the light spot on the cathode ray tube is moved on the map film to inform the driver of the present position of the automobile. More specifically, in this automobile position display unit, the course and running distance of the automobile are calculated by a microcomputer from data concerning the running distance and direction derived from a rotation detector associated with the wheel of the automobile and a direction detector such as a gyro-compass, and the light spot on the cathode ray tube is moved along the running course of the automobile in accordance with the output from the microcomputer.

The map film used in this automobile position display unit is a transparent plastic film on which the map is printed. This map film, when used, is clamped and fixed between the display surface of the cathode ray tube and the front surface cover of the display device.

Hitherto, various types of devices have been proposed for fixing the map film or sheet. These devices, however, could not stably hold the map film or sheet in correct position against vibration to which the map film or sheet is subjected during running of the automobile, as will be fully explained later with reference to the drawings.

SUMMARY OF THE INVENTION

Accordingly, an object of the invention is to provide a device for fixing a map film or sheet suitable for use in an information display unit on an automobile, capable of stably holding the film map or sheet against vibrations which occur during running of the automobile.

To this end, according to the invention, there is provided, in an information display apparatus in which a map film or sheet made of a light-transmitting material provided on the display surface of a cathode ray tube and information concerning the position of an automobile are combined to provide a visible information of the present position of the automobile, a sheet fixing device characterized by comprising: a sheet pressing member having a sheet pressing rubber; a plurality of independent biasing members spaced from one another and adapted to bias the sheet pressing member toward the display surface of the cathode ray tube; a cam adapted to be rotated by a sheet guide; and a sheet pressing member lifting lever adapted to be actuated by the cam so as to drive said sheet pressing member; whereby, when the sheet guide is rotated to an information medium take-out position, the cam actuates the sheet pressing member lifting lever to move the sheet pressing member away from the display surface of the cathode ray tube.

The above and other objects, as well as advantageous features of the invention will become more clear from the following description of the preferred embodiments taken in conjunction with the accompanying drawings.

BRIEF DESCRIPTION OF THE DRAWINGS

FIG. 4 is a perspective view of a sheet fixing device in accordance with an embodiment of the invention;

DESCRIPTION OF THE PREFERRED EMBODIMENT

Before turning to the detailed description of the preferred embodiment, an explanation will be made hereinunder as to a conventional sheet fixing device, in order that the drawback of the prior art and, hence, the advantage brought about by the invention, is fully understood.

Figure 1:
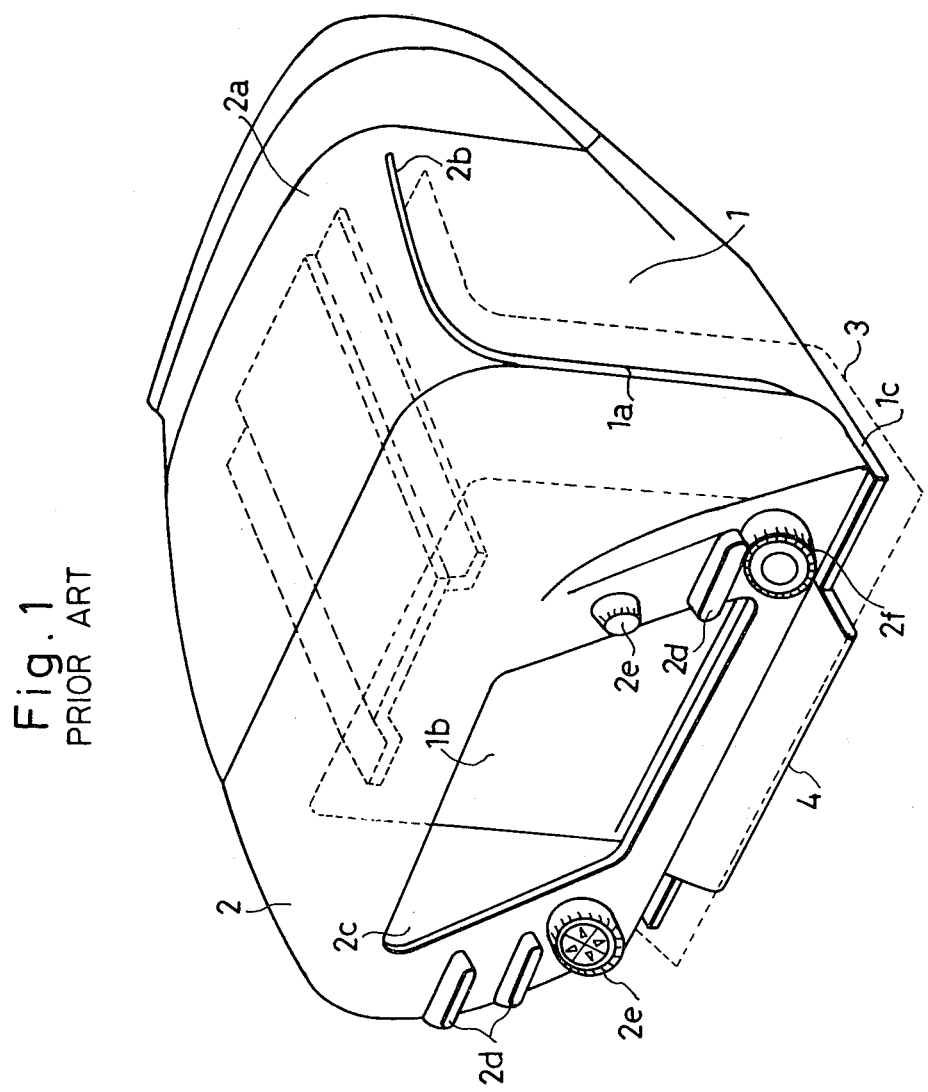
FIG. 1 is a perspective view of a conventional information display apparatus.
Figure 2:
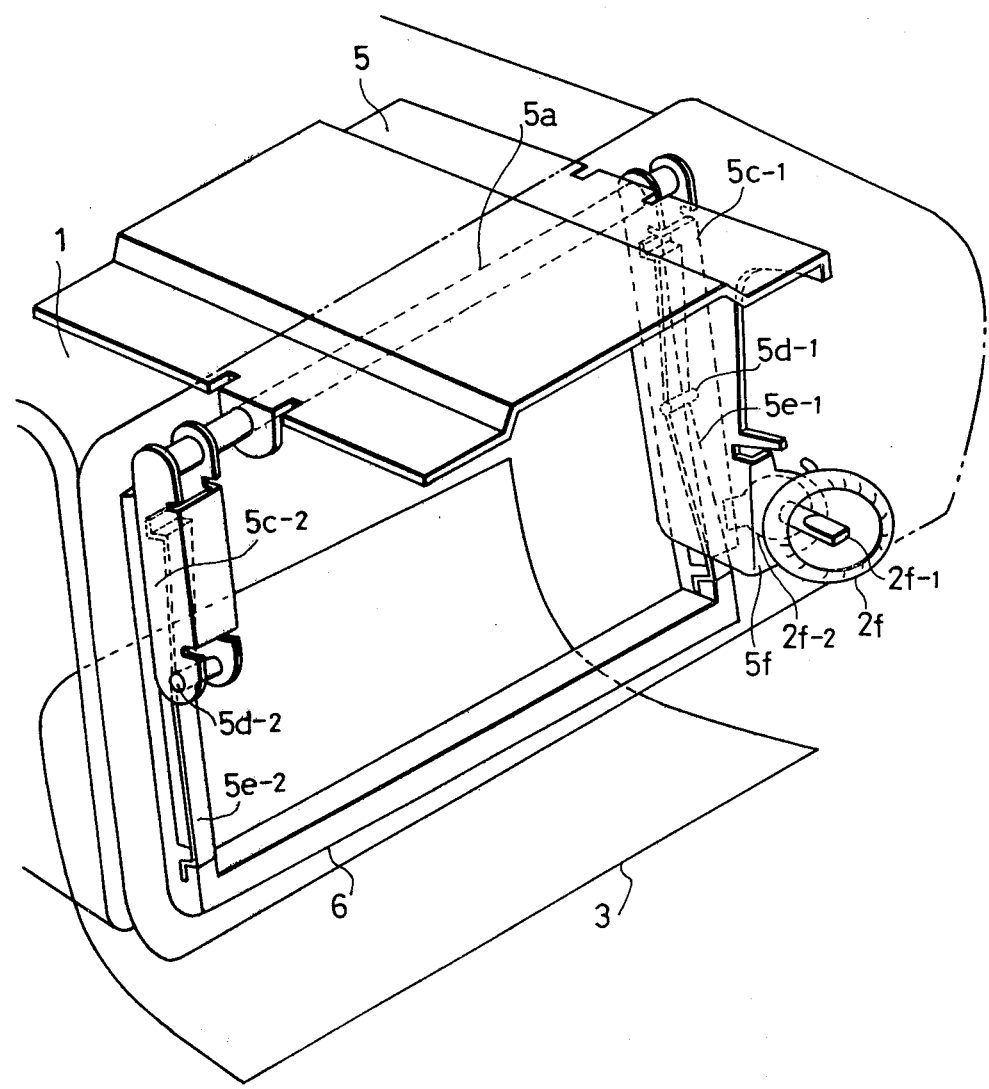
FIG. 2 is a perspective view of a conventional sheet fixing device.

Referring to FIG. 1 which is a perspective view of an automobile position display apparatus incorporating a conventional sheet (film map) fixing device, a reference numeral 1 denotes a main body of the apparatus accommodating an electronic circuit and a cathode ray tube for the display. A reference numeral 2 designates a head case disposed at the front side of the main body 1 and connected at its upper end to the latter by means of a connecting member 2a. A slit 1a formed between the main body 1 and the head case 2 is extended toward the connecting member 2a and is connected to a slit 2b formed between the connecting member 2a and the main body 1. The slits 1a and 2b are adapted to receive a map film sheet 3. The display surface 1b of the cathode ray tube and the map film sheet 3 disposed in front of the cathode ray tube is visible through a display window 2c formed at the center of the head case 2. At both ends of the head case 2, disposed are push buttons 2d for controlling the program and other purposes and manipulation knobs 2e for driving the light spot, manipulation of the power source switch and other purposes, as well as a rotational knob 2f for operating the sheet fixing device. A sheet guide member 4 is rotatably carried by the end of a lip member 1c extended along the slit 1a from the lower end of the main body 1 to the lower end of the head case 2. FIG. 2 is a perspective view of the apparatus with the head case 2 removed to show the internal structure.

In FIG. 2, a reference numeral 5 denotes a frame for holding and supporting a head case 2. The frame 5 rotatably carries a torque transmission shaft 5a. A downwardly extending elongated pressing arm 5c-1 is fixed to the right side end of the torque transmission shaft 5a as viewed in FIG. 2. A pin 5d-1 is provided at the center of the pressing arm 5c-1, and is in engagement with the central portion of a pressing spring 5e-1 which is constituted by a leaf spring. The upper and lower ends of the pressing spring 5e-1 are held in engagement with a substantially U-shaped sheet pressing member 6. A pressing arm 5c-2 is fixed to the left side end of the torque transmission shaft 5a as viewed in FIG. 2. A pin 5d-2 opposing to the pin 5d-1 makes an engagement with the central portion of a pressing spring 5e-2 constituted by a leaf spring. The upper and lower ends of the pressing spring 5e-2 are held in engagement with the sheet pressing member 6.

The aforementioned rotary knob 2f has a knob shaft 2f-1 which is rotatably secured to the lower end of a frame arm 5f suspended from the frame 5. A cam 2f-2 is fixed to the knob shaft 2f-1.

Figure 3A:
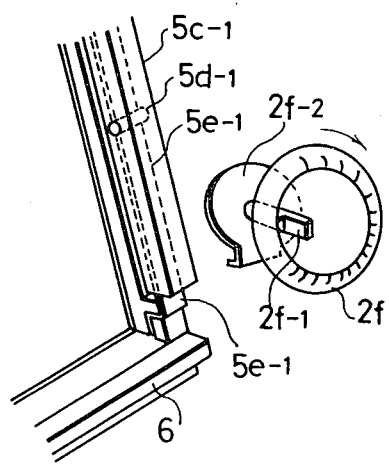
FIGS. 3A and 3B are perspective views of essential parts of the conventional sheet fixing device shown in FIG. 2.
Figure 3B:
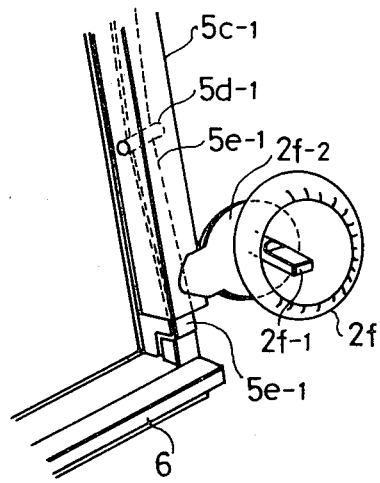

The conventional sheet fixing mechanism described heretofore is adapted to operate by the rotation of the rotary knob 2f. FIG. 3 is a perspective view of this sheet fixing device for explaining the operation. As the rotary knob 2f is rotated in the direction of the arrow, the knob shaft 2f-1 is rotated from the state shown in FIG. 3A to the state shown in FIG. 3B, so that the cam 2f-2 comes to ride the pressing arm 5c-1 to urge the latter toward the map film sheet 3. In consequence, the pin 5d-1 presses the pressing spring 5e-1 which in turn presses at its upper and lower ends the sheet pressing member 6.

Simultaneously, the pressing arm 5c-1 causes the torque transmission shaft 5a to rotate, so that pin 5d-2 urges the pressing spring 5e-2 which in turn presses at its upper and lower ends the sheet pressing member 6. In consequence, the torque of the rotation knob 2f is transmitted to four corners of the sheet pressing member 6 thereby to make the latter press the map film sheet 3 onto the display surface 1b of the cathode ray tube.

In this known sheet fixing device, the sheet is pressed non-uniformly because the four points on the sheet pressing member is merely pressed by pressing springs 5e-1 and 5e-2. Particularly, the pressing force is reduced at the left side because of the presence of a twisting loss in the torque transmission shaft 5a and transmission loss due to play of fit between the pressing arms 5c-1, 5c-2 and the torque transmission shaft 5a. In addition, since the stress is generated in respective leaf springs during the fixing of the map film sheet, the mechanical parts are kept in stressed condition during the long period of use of the map film sheet. Therefore, in order to achieve a precise operation, the mechanical parts are required to have high strength and rigidity and, accordingly, can hardly be formed of a light non-metallic material.

In addition, various minute adjustments such as adjustment of the frame position, adjustment of the spring pressure and so forth are required to compensate for the loss of power or motion in the transmission mechanism.

Furthermore, the pressing force on the map film sheet tends to be fluctuated due to vibration during the running of the automobile, to undesirably permit the offset of the map film sheet from the set position which hinders the indication of the correct position of the automobile.

These problems of the prior art, however, are completely overcome by the present invention, as will be understood from the following description of a preferred embodiment of the invention.

FIG. 4 is a perspective view of a sheet fixing device in accordance with the present invention. A sheet fixing device generally designated at a reference numeral 11 is accommodated by a head case (not shown) as in the case of the prior art device described before. The sheet fixing device 11 is supported by a frame 12 disposed at the inside of the head case so as to reinforce and hold the head case. The frame 12 is attached to the aforementioned connecting member. A pair of arms 12a are formed to be suspended from both ends of the frame 12.

A cam shaft bore 12b is formed at the end of the arm 12a above which formed is a fulcrum shaft bore 12c. The cam shaft bore 12b rotatably receives a cam shaft 12g, while the fulcrum shaft bore 12c fixedly receives a fulcrum shaft 14c.

Cams 12h are fixed to both ends of the cam shaft 12g projected to the outside of the arm 12a. The cam 12h is provided with a notch 12j (See FIGS. 6 and 7) for clearing a lever. A wide-spread sheet guide is fixed to the portion of the cam shaft 12g between both arms 12a.

A reference numeral 12d designates an arm for supporting the sheet pressing member. The arms 12d are extended outwardly of the left and right arms 12a and have slide shaft bores 12f which receive a slide bush 12e.

Figure 5A:
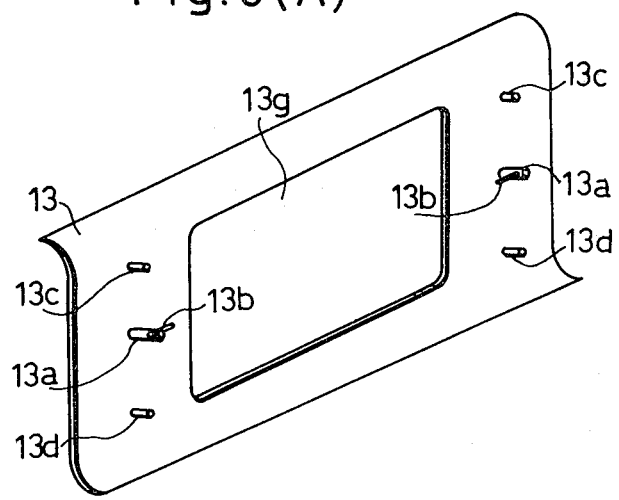
FIG. 5A is a top side perspective view of a sheet pressing member.
Figure 5B:
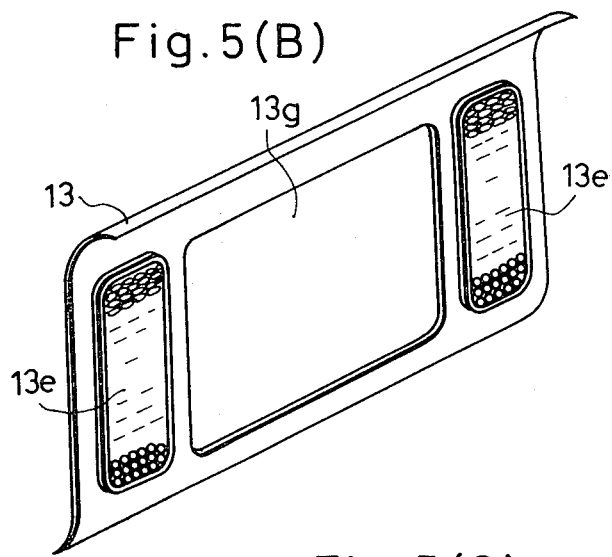
FIG. 5B is a bottom plan view of the sheet pressing member.
Figure 5C:
FIG. 5C is a sectional view of a pressing rubber.

FIG. 5A is a perspective view showing particularly a sheet pressing member 13. As will be seen from this Figure, a window 13g is formed at the center of the sheet pressing member 13. The sheet pressing member 13 is provided with slide shafts 13a and spring shafts 13c, 13d fixed in a symmetric manner to the left and right ends thereof. The slide shaft 13a is provided with a pin 13b fixed thereto. FIG. 5B is a perspective view of the rear side of the sheet pressing member 13. As will be seen from this Figure, pressing rubbers 13e having a number of small verruca-like projections are adhered to both end portions of the back side of the sheet pressing member 13. FIG. 5C is a sectional view of the pressing rubber 13e. The slide shaft 13a of the sheet pressing member is slidably received by the bore of the slide bush 12e of the sheet pressing member supporting arm 12d. Pressing springs 13f are loosely wound round the slide shaft 13a and the spring shafts 13c, 13d. Reference numeral 14 denote sheet pressing member lifting levers provided with fulcrum shaft bores 14b rotatably receiving the fulcrum shafts 14c provided on the arms 12a, so that the levers 14 are rotatably carried by the arms 12a.

The sheet pressing member lifting lever 14 is provided with a pin receiver 14a and a cam receiver 14d. The cam receiver 14d has a click groove 14e (See FIGS. 6 and 7). The pin receiver 14a is disposed to engage the pin 13b of the sheet pressing member 13, while the cam receiver 14d is provided to engage with the cam 12h.

A sheet guide 15a is rotatably carried by a lip portion 15 extending from the lower part of the main body 1 in such a manner as to be able to be reset by the force of a spring, and is positioned to oppose to the sheet guide 12i. A cam inversion spring 14f is disposed to act between the cam 12h and the cam receiver 14d. The map film sheet is designated at a reference numeral 16.

The sheet fixing device of this embodiment having the heretofore described construction operates in a manner explained hereinunder.

Figure 7:
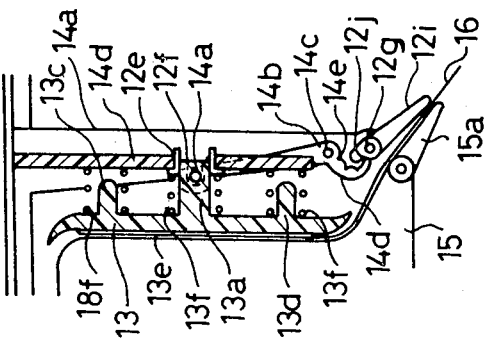
FIGS. 6 and 7 are sectional views for explaining the operation of the sheet fixing device.
Figure 6:
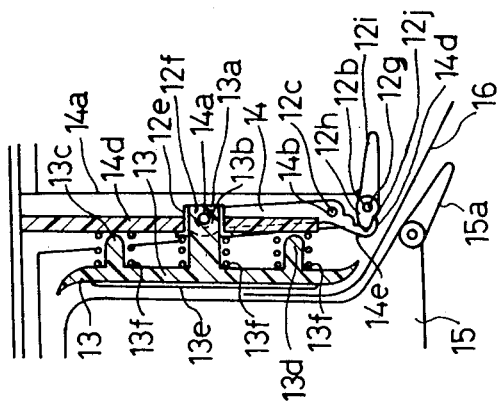

FIGS. 6 and 7 are sectional views of an essential part of the sheet fixing device, for explaining the operation. Referring first to FIG. 6 showing the state in which the sheet guide 12i has been raised upwardly, the cam shaft 12g is rotated as a result of the lifting of the sheet guide 12i followed by the rotation of the cams 12h fixed to both ends of the cam shaft 12g. The rotation of the cams 12h, i.e. the rotation of the rotation of the cams sliding on the surfaces of the cam receivers 14d of the sheet pressing member lifting levers 14, causes a rotation of the lifting levers 14 around the axis of the shaft 14c. This in turn serves to lift the sheet pressing member 13 away from the sheet 16, because the pin receiver 14a is in engagement with the pin 13b, to compress the pressing spring 13f.

In this state, it is possible to freely insert the sheet 16. Then, after positioning the sheet 16 at the predetermined position, the sheet guide 12i is moved downwardly so that the cam shaft 12g is rotated to bring the cams 12h into sliding engagement with the cam receivers 14a on the sheet pressing member lifting levers 14, so that the sheet pressing member lifting levers 14 are rotated around the axis of the fulcrum shaft 14c. In consequence, the sheet pressing member 13 presses and fixes the sheet 16 on the display surface of the cathode ray tube, by the resetting force exerted by the pressing springs 13f. In this state, the sheet guide 12i presses and rotates the sheet guide 15a to cooperate with the latter in clamping therebetween the sheet 16. At the same time, the click mechanism 14e of the cam receiver 14d repeatedly engage and disengage the cam 12h as the latter is rotated, to produce a click sound. In addition, the sheet guide 12j is positively rotated by the action of the cam inversion spring 14f so that the sheet guide 12i is held stably either at the position for fixing the map film sheet 16 or at the position where it permits the map film sheet 16 to be moved.

As has been described in detail, in the sheet fixing device of the invention, the sheet pressing member is pressed toward the display surface of the cathode ray tube by a plurality of independent biasing members (pressing springs) spaced from one another, so that the map film sheet can be pressed against the display surface of the cathode ray tube at a uniform pressure over its entire area. In addition, it is possible to lift the sheet pressing member by an equal small force applied to left and right sides of the sheet pressing member, because cams are provided at both ends of the shaft of the sheet guide which is wide-spread forwardly. Since the sheet pressing member is urged by the rotational torque of cams but by the resetting force of a plurality of springs, the map film sheet is pressed and fixed in such a state that there is no play of fit nor the twisting of the transmission shaft. This permits the torque transmission shaft to have a reduced diameter as compared with the conventional one and, hence, a reduced weight of the device as a whole. Since the uniform pressure on the map film sheet is ensured by confirming the uniformity of the forces of the springs, it is not necessary to take trouble of compensation for the transmission loss in the transmission mechanism and other troublesome adjusting work.

In addition, the sheet guide is provided for facilitating the insertion of the map film sheet and plays the role of a manipulation knob for the sheet pressing member. The sheet guides can clamp the map film sheet when the latter is fixed, so that the sheet is prevented from excessively projecting out of the device. This in turn eliminates the possibility of unintentional pulling of the map film sheet during the use of the latter. By providing the pressing rubbers having a number of verruca-like projections (bumpy surface) on the surface of the sheet pressing member for contacting the map film sheet, it is possible to hold the latter in close contact with the display surface of the cathode ray tube, even when there is small roughness or concavity and convexity, or dust particles, on the display surface of the cathode ray tube.

What is claimed is:

1. In an information display apparatus in which a sheet made of a light-transmitting material provided on the display surface of a cathode ray tube and information concerning the position of an automobile presented by said cathode ray tube are combined to provide a visible information of the present position of said automobile;

a sheet fixing device characterized by: a frame means, a sheet pressing member having sheet pressing portions movably mounted on said frame means; a plurality of independent biasing members spaced from one another and adapted to bias said sheet pressing member toward the display surface of said cathode ray tube; a sheet guide rotatably connected to said frame means; cams connected to said sheet guide and adapted to be rotated by said sheet guide; and sheet pressing member lifting levers pivotally mounted on said frame means and adapted to be actuated by said cams, said lifting levers connected to said sheet pressing member to position said sheet pressing member; whereby, when said sheet guide is rotated to a sheet take-out position, said cams actuate said sheet pressing member lifting levers to permit said sheet pressing member to be moved away from said display surface of said cathode ray tube.

2. A sheet fixing device for an information display apparatus as claimed in claim 1 wherein said sheet pressing member is a substantially rectangular member provided at its center with a window.

3. A sheet fixing device for an information display apparatus as claimed in claim 1 wherein said pressing portions of said sheet pressing member are rubber and are provided with a number of verruca-like projections.

4. A sheet fixing device for an information display apparatus as claimed in claim 1 wherein said sheet guide is attached to a head case provided in front of said cathode ray tube, so as to take a position at the lower part of the front side of said cathode ray tube, and wherein a lip portion projected from the front lower portion of the main body accommodating said cathode ray tube is disposed to oppose to said sheet guide, in such a manner that an insertion opening for said sheet is formed between said sheet guide and said lip portion.

5. A sheet fixing device for an information display apparatus as claimed in claim 1, wherein a locating click mechanism is provided between said cam and said sheet pressing member lifting lever.

* * * * *

UNITED STATES PATENT AND TRADEMARK OFFICE
CERTIFICATE OF CORRECTION

PATENT NO. : 4,377,048
DATED : March 22, 1983
INVENTOR(S) : Susumu Takagi; Nobuhiko Suzuki It is certified that error appears in the above-identified patent and that said Letters Patent is hereby corrected as shown below:

On the title page assignee should read

-- (73)Assignee: Alps Electric Co., Ltd., Tokyo, Japan and
Honda Motor Co., Ltd., Tokyo, Japan,
Part interest --.

Signed and Sealed this

First Day of September, 1987

Attest:

DONALD J. QUIGG

Attesting Officer

Commissioner of Patents and Trademarks